United States Patent [19]
Sung

[11] Patent Number: 6,052,163
[45] Date of Patent: Apr. 18, 2000

[54] THIN FILM TRANSISTOR AND LIQUID CRYSTAL DISPLAY DEVICE

[75] Inventor: Chae Gee Sung, Miyagi-ken, Japan

[73] Assignee: Frontec Incorporated, Japan

[21] Appl. No.: 08/825,946

[22] Filed: Apr. 1, 1997

[30] Foreign Application Priority Data

Apr. 4, 1996 [JP] Japan .................................. 8-082780

[51] Int. Cl.[7] .......................... G02F 1/136; G02F 1/1343; G02F 1/1337
[52] U.S. Cl. .............................. 349/42; 349/44; 349/141; 349/139; 349/38; 349/123
[58] Field of Search ................ 349/42, 44, 141, 349/139, 38, 123

[56] References Cited

U.S. PATENT DOCUMENTS

| | | | |
|---|---|---|---|
| 5,541,748 | 7/1996 | Ono et al. | 359/59 |
| 5,598,285 | 1/1997 | Kondo et al. | 349/39 |
| 5,668,649 | 9/1997 | Suzuki et al. | 349/42 |
| 5,844,255 | 12/1998 | Suzuki et al. | 349/44 |

FOREIGN PATENT DOCUMENTS

| | | |
|---|---|---|
| 6-160878 | 6/1994 | Japan . |
| 6-273803 | 9/1994 | Japan . |

*Primary Examiner*—Frank G. Font
*Assistant Examiner*—Roy M. Punnoose
*Attorney, Agent, or Firm*—Brinks Hofer Gilson & Lione

[57] ABSTRACT

A liquid crystal display element of the present invention is prepared according to a top-gate structure in which a gate electrode is formed on a semiconductor film. The liquid crystal display element is provided with a first substrate and a second substrate each having an orientation film. A plurality of linear electrodes are formed on the first substrate so as to apply a voltage between the electrodes. The orientation film of the first substrate is oriented in parallel with the longitudinal direction of the linear electrodes.

3 Claims, 8 Drawing Sheets

VOLTAGE OFF
(BRIGHT STATE)

FIG. 6B

VOLTAGE ON
(DARK STATE)

$n_1 = n_2$
(OFF STATE)

FIG. 8B
PRIOR ART $n_1' \neq n_2'$
(ON STATE)

VOLTAGE OFF
(DARK STATE)

VOLTAGE ON
(BRIGHT STATE)

THIN FILM TRANSISTOR AND LIQUID CRYSTAL DISPLAY DEVICE

BACKGROUND OF THE INVENTION

1. Field of the Invention

The present invention relates to a liquid crystal display element used for liquid crystal display devices displaying various kinds of images. More particularly, the present invention relates to a liquid crystal display element of high-aperture rate produced by a simple method at low cost.

2. Description of the Prior Art

Liquid crystal display devices have been widely used as display devices which can be produced in light-weight, small-size, and thin shapes. Among them, active matrix type liquid crystal display devices according to a twisted nematic mode (TN mode) are widely known to have high contrast and high image quality with low driving voltage and low power consumption.

Figure 6A:
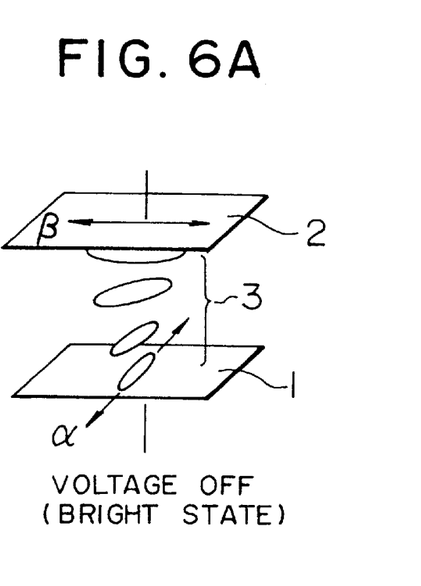
FIG. 6A shows orientation of liquid crystal molecules when no electric field is applied thereto and FIG. 6B shows orientation of liquid crystal molecules when an electric field is applied thereto.
Figure 6B:
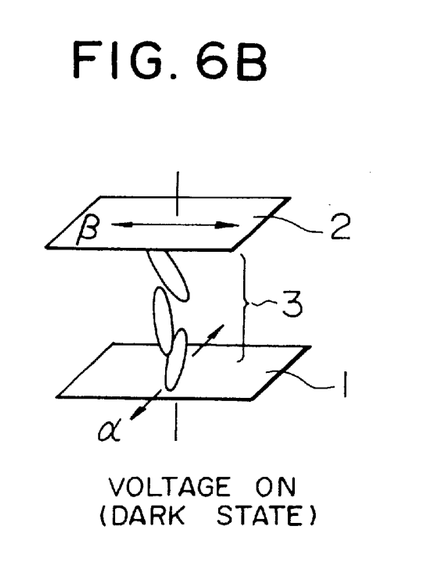

Liquid crystal display elements according to the above general TN mode a re constructed as follows: two glass substrates each provided with a polarizing plate, a transparent electrode, and an orientation film are positioned opposedly at an interval such that the orientation direction of each orientation film differs 90° from the other in order to twist nematic liquid crystals, which are provided between the substrates, by 90°. In other words, as is shown in FIG. 6A, a polarized light beam transmitted through a substrate 1 having a polarizing plate alters its polarization direction $\alpha$ by 90° by proceeding along liquid crystals 3 twisted at 90° so that the light beam can pass through another substrate 2 having a polarizing plate of which polarization direction is $\beta$. As a result, the liquid crystal display element is in a bright state. Meanwhile, by applying a voltage between the substrates 1 and 2, the liquid crystals 3 are oriented along the resulting electric field, as is shown in FIG. 6B. Thus, the polarization direction $\alpha$ of the polarized light beam does not change and the light beam is shaded by the polarizing plate of the substrate 2, resulting in a dark state of the liquid crystal display element.

Figure 7:
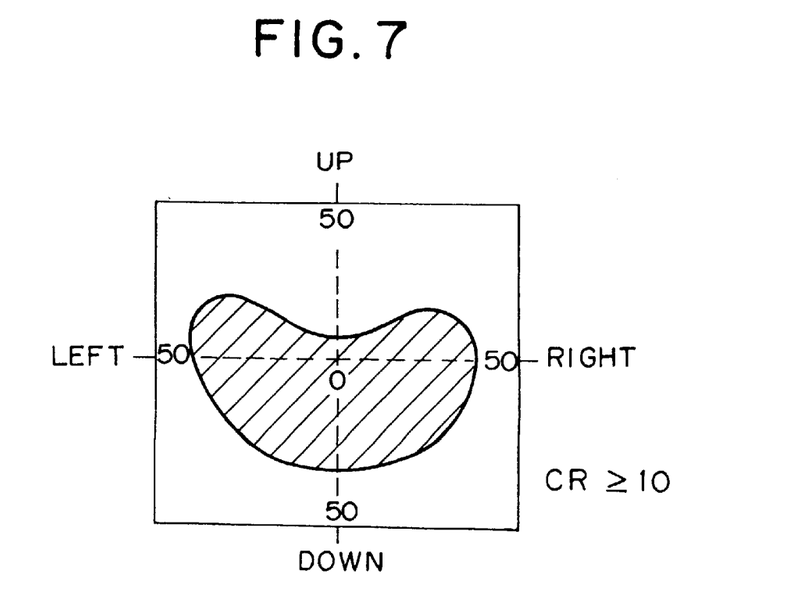
FIG. 7 shows dependency of liquid crystal on angle of view.

Currently dependency on angle of view is a problem in liquid crystal display elements of the above TN mode. FIG. 7 shows general dependency of liquid crystal display elements of TN mode on angle of view. The shaded portion in FIG. 7 indicates a region in which contrast (CR) is not less than 10. It is apparent from FIG. 7 that although visibility from the lateral direction is excellent in liquid crystal display elements of TN mode, that from the vertical direction, and particularly from above, is extremely inferior. Reasons for the above will be explained below.

Figure 8A:
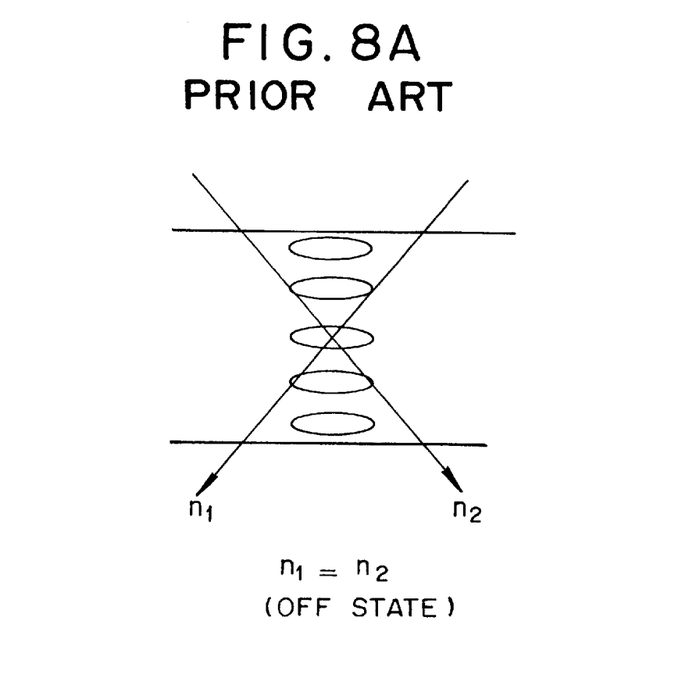
FIG. 8A shows light beam transmission through a liquid crystal layer of a prior art when no electric field is applied thereto and FIG. 8B shows light beam transmission through a liquid crystal layer of a prior art when an electric field is applied thereto.
Figure 8B:
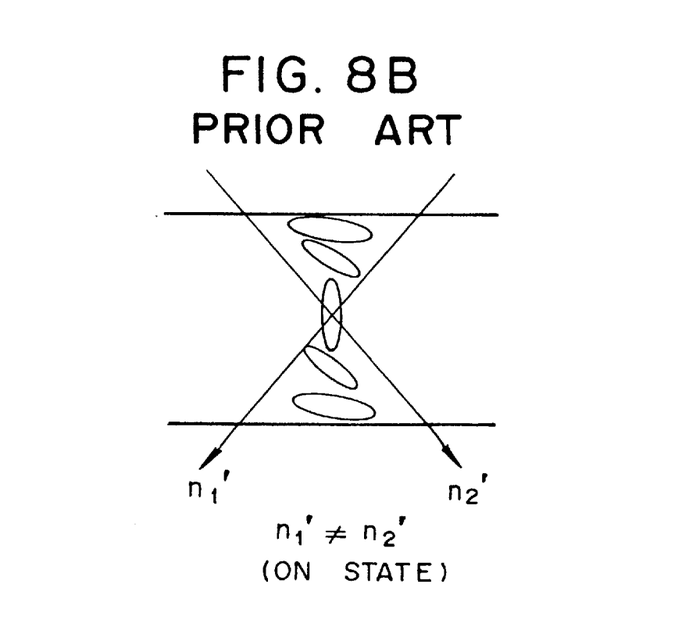

As is shown in FIGS. 6A and 8A, when all liquid crystal molecules lie flat and are oriented in the same direction, refractive indexes, i. e., n1 and n2 shown in FIG. 8A, are not largely affected by incident directions of light beams entering into and outgoing from the liquid crystal layer and have almost the same value. Therefore the dependency on angle of view is not remarkable. However, when liquid crystal molecules are oriented along an applied electric field such that the tilt angle of each liquid crystal molecule differs from the others, as is shown in FIG. 6B or 8B, the refractive indexes n1' and n2' are different depending on the incident angles of transmitting light beams because liquid crystal molecules have different refractive indexes for the major axis direction and the minor axis direction. As a result, in a normally white display mode the transmittance under applied voltage is largely affected by dependency on angle of view and thus contrast shows significant changes depending on angle of view.

The inventors of the present invention describe epoch-making liquid crystal display elements for solving the problem of viewing from above, in specifications of Japanese Patent Application Nos. 7-1579 and 7-306276.

Figure 9:
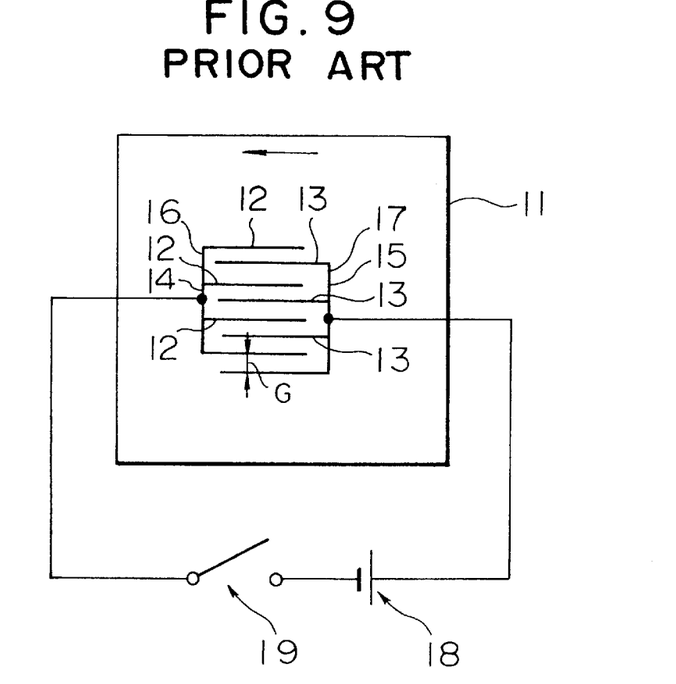
FIG. 9 is a plan view of a substrate having electrodes, which substrate is described in a specification of Japanese Patent Application by the inventors of the present invention.

According to techniques disclosed in the above patent applications, electrodes for driving liquid crystals are not provided for each of the upper and lower substrates holding the liquid crystals therebetween. Two types of linear electrodes 12 and 13 each having different polarities are provided at separate positions only for the lower substrate (the first substrate) 11 shown in FIG. 9 and no electrode is provided for the upper substrate (the second substrate) 10. By applying a voltage, liquid crystal molecules 36 are oriented along the directions of electric fields generated between the linear electrodes 12 and 13. In more detail, the linear electrodes 12 are connected by a base wire 14 to form a comb-shaped electrode 16 and the linear electrodes 13 are connected by a base wire 15 to form a comb-shaped electrode 17; the linear electrodes 12 and 13 of the comb-shaped electrodes 16 and 17 are positioned alternately so as not to contact each other; and a switching element 19 connects to the base wires 14 and 15. Furthermore, as is shown in FIG. 11, an orientation film is formed on the liquid crystal side of the upper substrate 10 to align the liquid crystal molecules 36 in the $\beta$ direction, another orientation film is formed on the liquid crystal side of the lower substrate 11 to align the liquid crystal molecules 36 in the $\gamma$ direction parallel to the $\beta$ direction, and conventional polarizing plates are provided for the substrates 10 and 11.

Figure 11A:
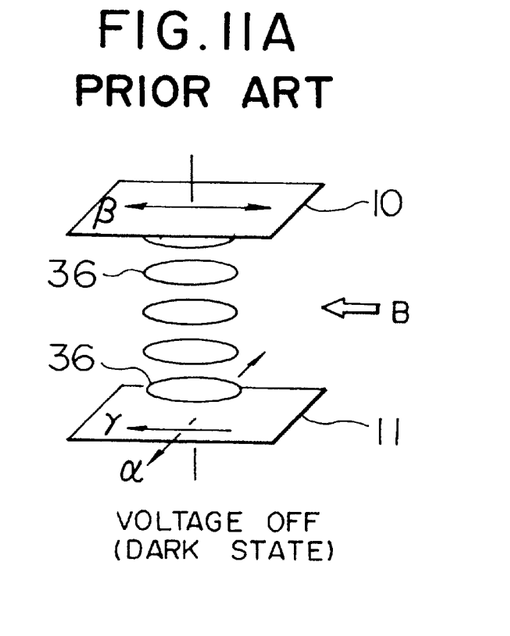
FIG. 11A shows arrangement of liquid crystal molecules in a dark state described in a specification of Japanese Patent Application by the inventors of the present invention and FIG. 11B is a side view of the arrangement shown in FIG. 11A.
Figure 11B:
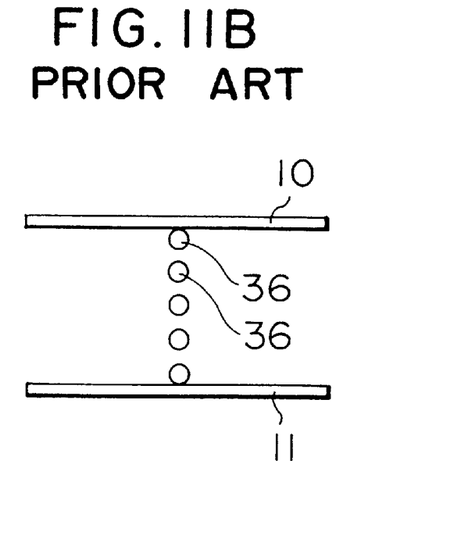

According to the above structure, the liquid crystal molecules 36 are homogeneously oriented in the same direction when no voltage is applied between the linear electrodes 12 and 13, as is shown in FIGS. 11A and 11B. A light beam transmitted through the lower substrate 11 is polarized in the $\alpha$ direction by the polarizing plate, passes through a layer of the liquid crystal molecules 36, and then reaches the polarizing plate of the upper substrate 10, which polarizing plate has a polarization direction $\beta$ different from the direction $\alpha$. The light beam is thereby shaded by the polarizing plate of the upper substrate 10 and unable to pass through the liquid crystal display element, thereby rendering the liquid crystal display element in a dark state.

When a voltage is applied between the linear electrodes 12 and 13, among the liquid crystal molecules 36, those adjacent to the lower substrate 11 are aligned perpendicular to the longitudinal direction of the linear electrodes 12 and 13. The nearer a liquid crystal molecule is located to the lower substrate, the more strongly this phenomenon is observed. In other words, lines of electric force perpendicular to the longitudinal direction of the linear electrodes 12 and 13 are generated so that the longitudinal axes of the liquid crystal molecules, 36 oriented in the $\gamma$ direction are altered perpendicular to the $\gamma$ direction by controlling the force of the electric field which is stronger than that of the orientation film.

Figure 12A:
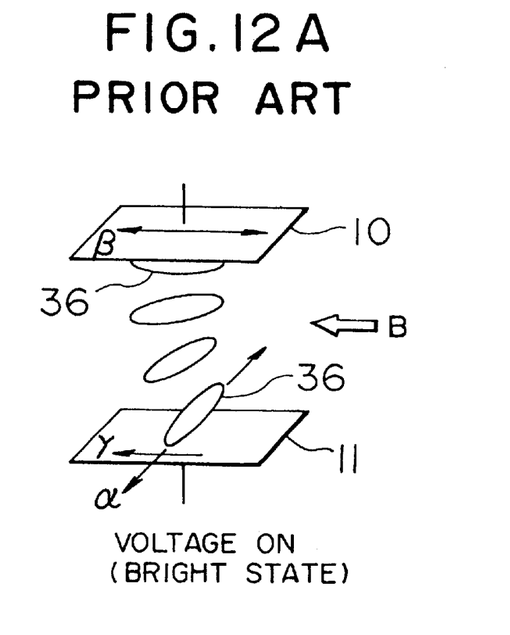
FIG. 12A shows arrangement of liquid crystal molecules in a bright state described in a specification of Japanese Patent Application by the inventors of the present invention and FIG. 12B is a side view of the arrangement shown in FIG. 12A.
Figure 12B:
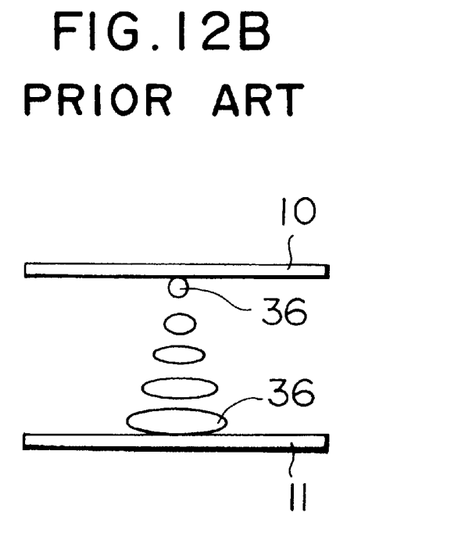

Therefore, 90° twisted orientation is achieved by applying a voltage between the linear electrodes 12 and 13, as is shown in FIGS. 12A and 12B. Under this condition, the polarization direction of polarized light beams transmitted through the lower substrate 11 and polarized in the $\alpha$ direction is converted by the twisted liquid crystal molecules 36 such that the polarized light beams are allowed to pass through the upper substrate 10 having a polarizing plate with polarization direction $\beta$, thereby exhibiting a bright state.

Figure 13:
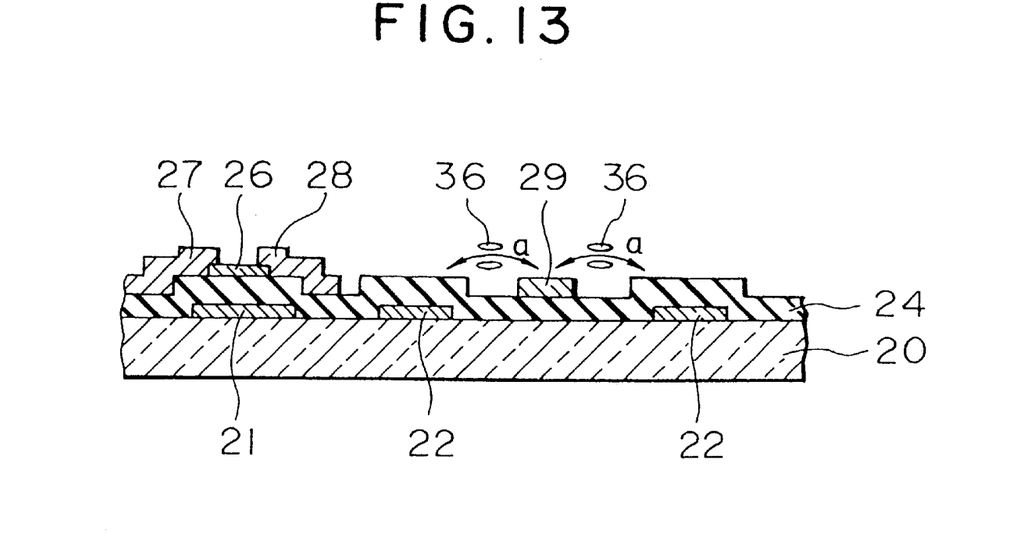
FIG. 13 shows a sectional structure of a liquid crystal display element.
Figure 14:
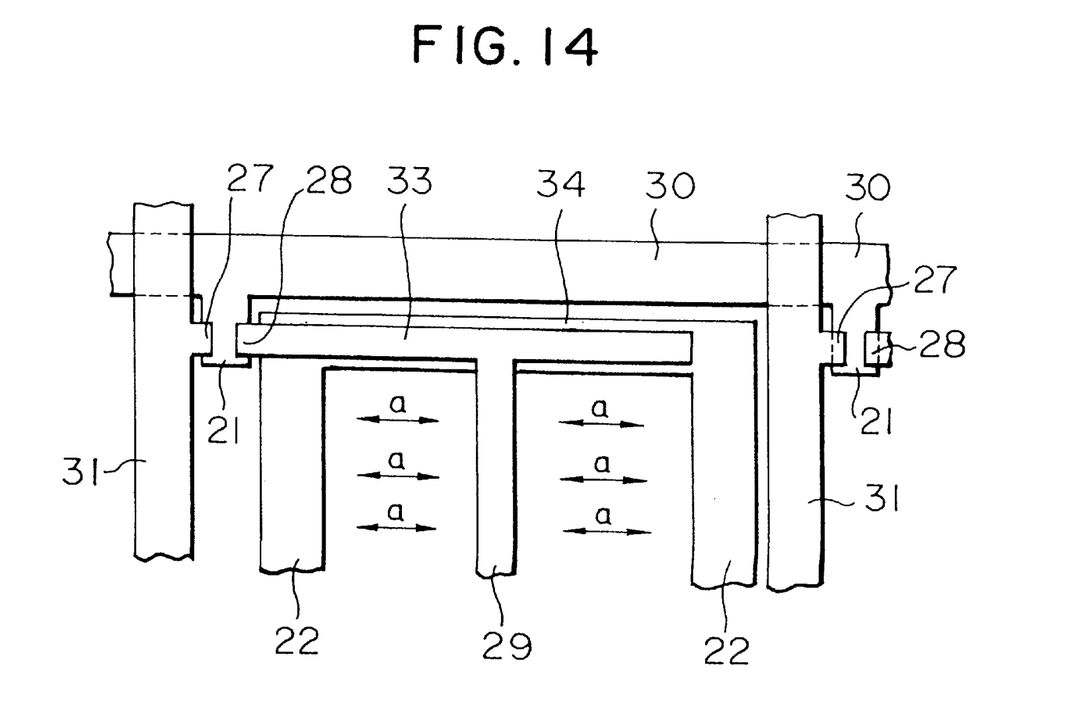
FIG. 14 is a plan view of the structure shown in FIG. 13.

FIGS. 13 and 14 show a structure in which the linear electrodes 12 and 13 are applied to a practical active matrix type liquid crystal driving circuit.

In the structure shown in FIG. 13, on a transparent substrate 20 such as a glass substrate, a metallic gate electrode 21 and metallic first linear electrodes 22 are provided separately and in parallel with each other. A gate insulating film 24 is formed to cover these electrodes, a source electrode 27 and a drain electrode 28 are formed on a portion of the gate insulating film 24 corresponding to the gate electrode 21, a semiconductor film 26 is provided between the source electrode 27 and the drain electrode 28, and a metallic second linear electrode 29 is formed on the gate insulating film between the first linear electrodes 22. FIG. 14 is a plan view of the structure shown in FIG. 13. Gate wires 30 and signal wires 31 are formed on the transparent substrate 20 according to a matrix pattern. The gate electrode 21 leading to the gate wire 30 is provided at a corner of each region surrounded by the gate wires 30 and the signal wires 31. The second linear electrode 29 connects to the drain electrode 28 via a base wire 33 and is provided between the first linear electrodes 22 which are connected through a base wire 34. The base wires 33 and 34 overlap each other with the gate insulating film 24 shown in FIG. 13 therebetween so as to ensure capacitance.

In the above structure, lines of electric force produced by electric fields are formed along the directions of the arrows a shown in FIGS. 13 and 14. Thus, the liquid crystal molecules 36 are oriented in a manner shown in FIG. 13.

However, according to the above structure of a liquid crystal display element, the first linear electrodes 22 and the second linear electrode 29 are light-shading metallic electrodes, thus the shading area tends to be exceedingly large and the aperture rate of the resulting liquid crystal display element disadvantageously decreases.

Moreover, when the gate electrodes 21 are provided below the semiconductor film 26, overlapping portions between the gate electrodes 21, source electrodes 27, and drain electrodes 28 increase, resulting in a parasitic capacitance via the gate insulating film 24 formed therebetween. Thus, capacitance at the time of liquid crystal driving differs from the desired value, which fact could incur display-quality deterioration.

SUMMARY OF THE INVENTION

In view of the above-mentioned problems, it is an object of the present invention to provide a liquid crystal display element having a broad angle of view and a high aperture rate, wherein element rarely exhibits the parasitic-capacitance problem and can be produced by a simple method.

To solve the above problems, the present invention provides a liquid crystal display element comprising: a first substrate provided with an orientation film; a second substrate which is arranged in an opposed position to the first substrate and which is provided with an orientation film on the first substrate side; a liquid crystal layer comprising nematic liquid crystals provided between the first substrate and the second substrate; a plurality of linear electrodes arranged in parallel with each other at intervals on the first substrate; a switching element applying a voltage between the plurality of electrodes; in which the orientation films of the first substrate and the second substrate are subjected to orientation treatment in parallel with the longitudinal direction of the linear electrodes; the switching element is composed of a shading film formed on the first substrate, an insulating film formed on the shading film, a semiconductor film formed on the insulating film on the shading film, a gate electrode formed above the center of the semiconductor film with an insulating portion therebetween, silicide layers formed at both sides of the semiconductor film, and a source electrode and a drain electrode both connecting to the semiconductor film via the silicide layers; and at least one of the plurality of linear electrodes and the shading film are formed on the same plane on the first substrate and covered with the insulating film which covers the shading film, and the rest of the linear electrodes for applying a voltage different from that applied to the at least one electrode are formed on the insulating film and connected to the drain electrode of the switching element.

The present invention also provides a liquid crystal display element, in which gate wires and signal wires are formed on the first substrate according to a matrix pattern, the gate electrode is formed near a crossing of the gate wires and the signal wires, and the linear electrodes are positioned in a region surrounded by the gate wires and the signal wires.

The present invention further provides a liquid crystal display element, in which either of a portion of the linear electrode formed on the same plane as the shading film on the first substrate or a portion of another linear electrode opposed to the linear electrode with the insulating film therebetween is extended and overlaps with the other electrode to produce capacitance.

DESCRIPTION OF THE PREFERRED EMBODIMENT

The present invention will be better understood from the following description of the preferred embodiments taken in conjunction with the accompanying drawings.

Figure 1:
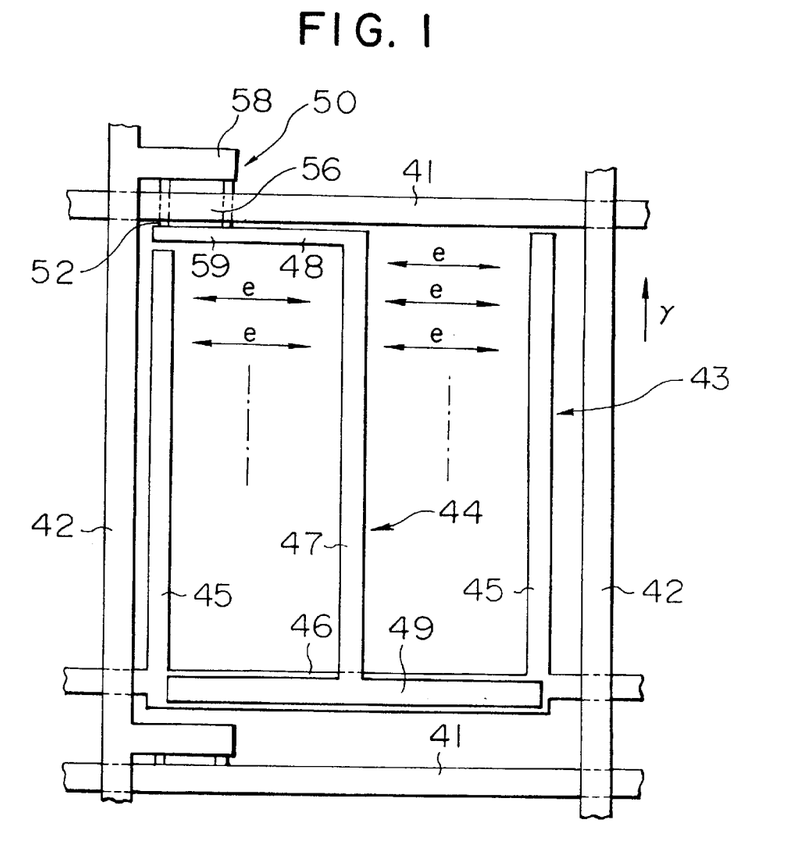
FIG. 1 is a plan view showing the first embodiment of liquid crystal driving circuit pattern applicable to a liquid crystal display element of the present invention.
Figure 2:
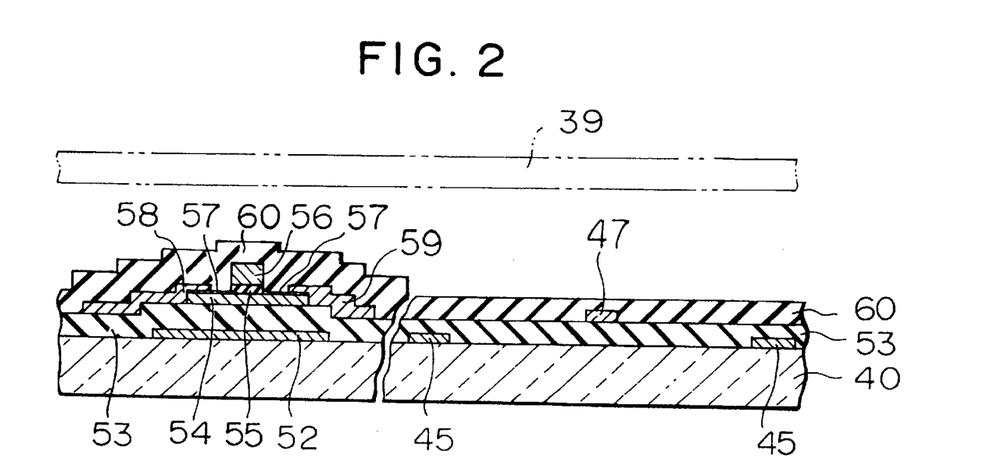
FIG. 2 is a sectional view in which the liquid crystal driving circuit pattern shown in FIG. 1 is provided on a substrate.

FIGS. 1 and 2 show an embodiment of a liquid crystal driving circuit pattern applicable to a liquid crystal display element of the present invention. FIG. 1 is a plan view showing a main part of a wiring pattern and FIG. 2 shows a sectional structure thereof.

In this embodiment, on a transparent substrate (a first substrate) 40, a plurality of gate wires 41 and signal wires 42 are formed according to a matrix pattern, and a comb-shaped electrode 43 and another electrode 44 are positioned in a region surrounded by the gate wires 41 and the signal wires 42. The electrode 43 of this embodiment is formed in a comb shape such that two linear electrodes 45 are positioned adjacent and in parallel with the signal wires 42 and basal portions of the linear electrodes 45 are connected by a base wire 46 positioned adjacent and in parallel with the gate wires 41. The electrode 44 is composed of: a linear electrode 47 positioned in parallel between the two linear electrodes 45; a base wire 48 connected to a basal portion of the linear electrode 47 and positioned in parallel with the gate wires 41; and a linear capacitance generating portion 49 connecting to the tip of the linear electrode 47, which capacitance generating portion 49 is positioned adjacent to the gate wires 41 and overlaps above with the base wire 46. Furthermore, a switching element 50 is provided for a portion of the gate wire 41 near the signal wire 42.

FIG. 2 shows a practical layer-structure of the above circuit, in which a shading film 52 is provided on a transparent substrate 40 according to an island pattern, a semiconductor film 54 is formed thereon with an insulating film 53 therebetween, the gate electrode 56 is formed on the center of the semiconductor film 54 with an insulating portion 55 therebetween, silicide layers 57 are provided at both sides of the insulating portion 55, a source electrode 58 is formed in contact with one of the silicide layers 57, a drain electrode 59 is formed in contact with the other silicide layer 57, and an insulating film 60 is provided to cover these to complete a top-gate structure. In the above structure, the gate electrode 56 is prepared by utilizing a portion of the gate wire 41. The linear electrodes 45 and the shading film 52 are formed on the same plane on the transparent substrate 40 and covered with the insulating film 53. A linear electrode 47 of which basal portion 48 connects to the drain electrode 59 is provided on the insulating film 53. Furthermore, the linear electrodes 45 and 47 are formed from transparent conductive ITO (indium tin oxide) films or metallic electrode films, and the shading film 52 is formed from a metallic shading conductive film.

The circuit shown in FIGS. 1 and 2 can be applied to the liquid crystal display element explained above with reference to FIGS. 11 and 12. Thus, when the lower substrate 11 shown in FIG. 11 is employed as the substrate 40 shown in FIG. 2, the resulting liquid crystal display element is equipped with the circuit, and also, with a substrate (a second substrate) 39 which has the same structure as the opposed substrate 10 shown in FIGS. 11 and 12 and which is positioned above the substrate 40 with a liquid crystal layer therebetween.

Moreover, in practice, an orientation film oriented in the γ direction shown in FIG. 11 is formed over the insulating film 60 on the substrate 40. Another orientation film oriented in the β direction shown in FIG. 11 is formed over the liquid crystal layer side of the substrate 39. The γ direction shown as the lateral direction in FIGS. 11 and 12 is indicated as the vertical direction in FIG. 1.

According to the above circuit, voltage application between the linear electrodes 45 and 47 is switchable by the use of the switching element 50.

Therefore, electric fields along the arrows e shown in FIG. 1 can be applied by voltage application between the linear electrodes 45 and 47 using the switching element 50. The liquid crystal molecules 36 are thereby arranged in the 90° twisted state (i. e., bright state) between the substrates as is shown in FIG. 12. In addition, the liquid crystal molecules 36 are arranged in the non-twisted state in which the liquid crystal molecules 36 are parallel to both substrates (i. e., dark state) as is shown in FIG. 11 by applying no voltage between the linear electrodes 45 and 47. Therefore, orientation of the liquid crystal molecules 36 can be controlled in a manner shown in FIGS. 11 and 12 using the circuit shown in FIGS. 1 and 2. When back-light beams are introduced from the lower side of the substrate 40 shown in FIG. 2, the dark and bright states are switchable by controlling orientation of liquid crystal molecules. During an "on" period of the switching element 50, continuity is achieved as follows: an electric filed generated by the gate electrode 56 produces electrons and holes in a portion of the semiconductor film 54 corresponding to the lower side of the insulating portion 55, and this portion of the semiconductor film 54 serves as a channel through which the generated electrons move.

According to the above structure, back-light beams introduced from the lower side of the substrate 40 shown in FIG. 2 are shaded by the shading film 52 and cannot reach the semiconductor film 54. Therefore undesired photoelectric current will not be present in the semiconductor film 54, resulting in improved response. In addition, since the liquid crystal molecules 36 are fundamentally aligned in parallel with both substrates regardless of electric-field application and only the degree of twist is altered, rapid response is possible and dependency on angle of view decreases.

Figure 10:
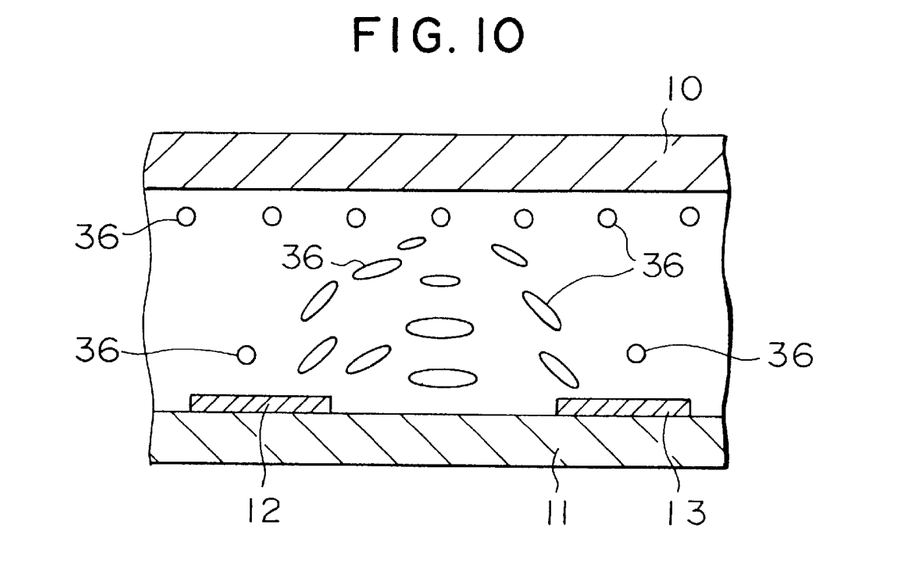
FIG. 10 shows orientation of liquid crystal molecules when a voltage is applied to linear electrodes.

Moreover, when the linear electrodes 45 and 47 are composed of transparent film, the liquid crystal molecules 36 positioned above the linear electrodes 45 and 47 stand up and allow back-light beams to pass through, as is shown in FIG. 10, due to voltage applied between the linear electrodes 45 and 47 in a normally black type display mode. Therefore, the portions above the linear electrodes 45 and 47 exhibit a bright state and contribute to a display. As a result, a higher aperture rate is achieved in liquid crystal display elements. Meanwhile, when the linear electrodes 45 and 47 are metallic shading electrodes, the regions corresponding to the metallic electrodes cannot contribute to the display because of shading by the metallic electrodes, resulting in reduction in aperture rate. When no voltage is applied to the linear electrodes 45 and 47, the display is in a dark state and the condition of the liquid crystal molecules positioned above the linear electrodes 45 and 47 do not largely affect the dark-state display.

For producing a circuit having the above structure, the shading film shown in FIG. 2 is prepared by patterning a metallic back-light shading film formed on the transparent substrate 40. Since the shading film 52 and the electrode 43 are provided on the same plane, they can be prepared by simultaneous patterning if they are made of the same material. In addition, when the shading film 52 and the electrode 43 are made of different materials, multiple film-forming and patterning is performed so as to provide the shading film 52 and the electrode 43 on the same plane of the substrate 40.

After forming the shading film 52 and the electrode 43, the insulating film 53 to cover these and a semiconductor film are prepared and patterned such that the semiconductor film 53 is positioned on the insulating film 53 above the shading film 52.

An insulating film and a gate electrode film are then continuously formed on the above films, followed by patterning to prepare an insulating portion 55, a gate electrode 56 formed on the insulating portion 55, and gate wires 41.

By ion-doping conducted above the semiconductor film 54, silicide layers 57 are provided at both sides of the insulating portion 55 formed on the semiconductor film 54.

An electrode film is then provided on the above structure and patterned into a source electrode 58, a drain electrode 59, and signal wires 42. Finally, the insulating film 60 is formed to complete a circuit having a structure shown in FIGS. 1 and 2. When a contact pad is required for the above structure, an appropriate hole connecting to the pad is provided for the insulating film 60.

According to the above-mentioned method, a driving circuit for a liquid crystal display element having a top-gate structure in which a gate electrode 56 is positioned on a semiconductor film 54 can be manufactured, which circuit is switchable between display and non-display modes by twisting liquid crystal molecules by 90° while maintaining the liquid crystal molecules in parallel with the substrates. In the top-gate structure, the overlapping area between the gate electrode 56, the drain electrode 59, and the source electrode 58 can be reduced, thereby decreasing parasitic capacitance. As a result, auxiliary capacitance for each pixel, that is, the capacitance generating section 49, can be down-sized. Therefore, a high aperture rate is realized in the above liquid crystal display element in which liquid crystal molecules are twisted by 90° using the linear electrodes 45 and 47.

In addition, according to the above manufacturing method, patterning can be performed by a small number of steps, i. e., four steps at minimum.

Figure 3:
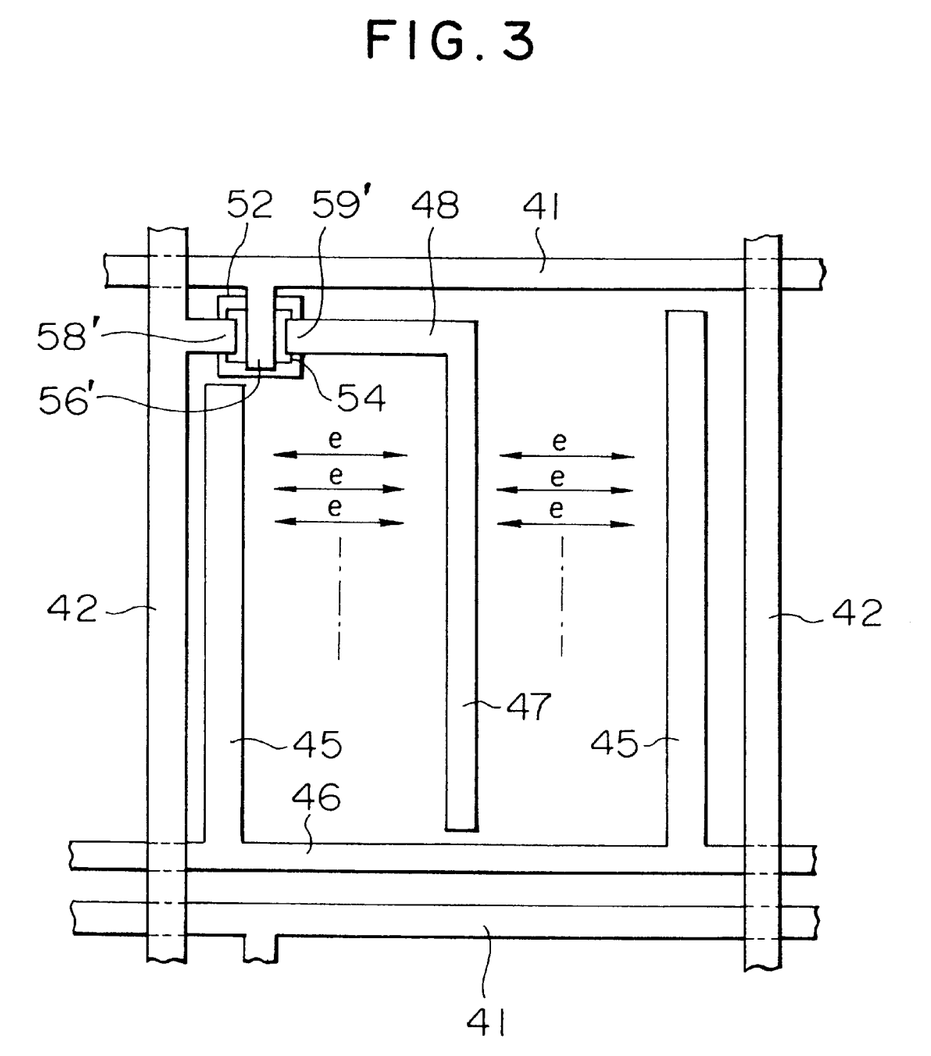
FIG. 3 is a plan view showing the second embodiment of liquid crystal driving circuit pattern applicable to a liquid crystal display element of the present invention.

FIG. 3 shows the second embodiment of a driving circuit pattern applicable to a liquid crystal display element of the present invention. The driving circuit pattern of the second embodiment has a similar structure to that of the first embodiment, except for the following points: A gate electrode 56' is formed between a source electrode 58' and a drain electrode 59' by extending a portion of the gate wire 41 in a direction parallel to the signal wires 42, which portion is near the signal wire 42. The capacitance generating section 49 formed at the tip of the linear electrode 47 in the first embodiment is omitted in the second embodiment. In the figure, the same numerals as in the first embodiment indicate the same parts and explanations concerning these parts are omitted.

Almost the same effect as that obtained from the first embodiment can be obtained according to the structure shown in FIG. 3, except for excluding the effect due to the capacitance generating section 49.

Figure 4:
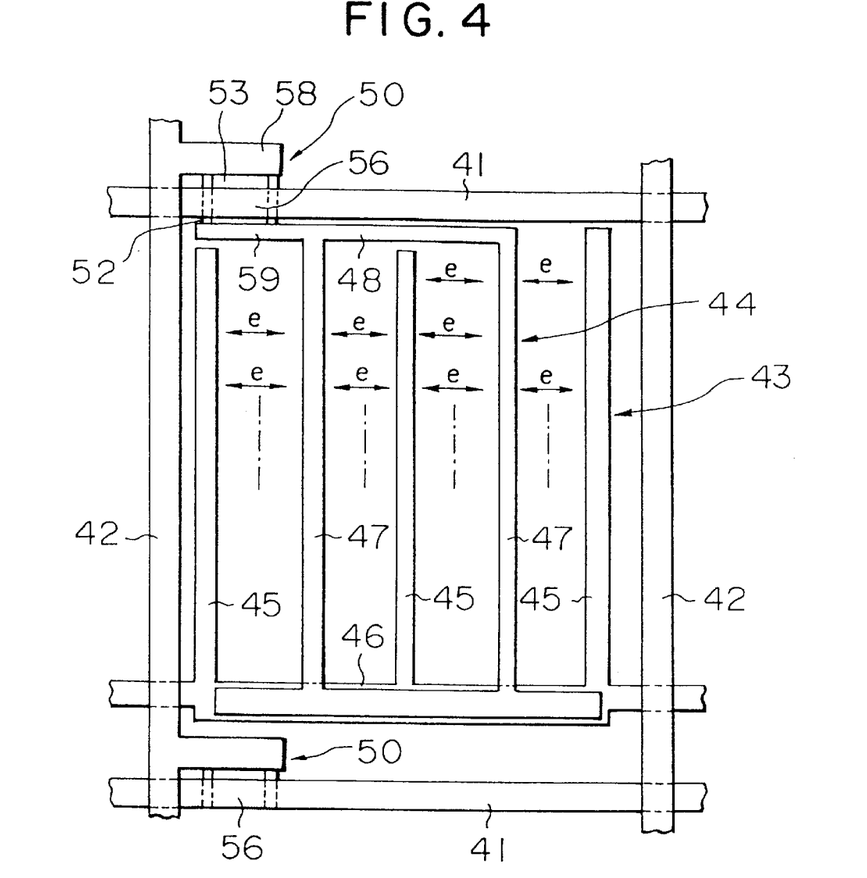
FIG. 4 is a plan view showing the third embodiment of liquid crystal driving circuit pattern applicable to a liquid crystal display element of the present invention.
Figure 5:
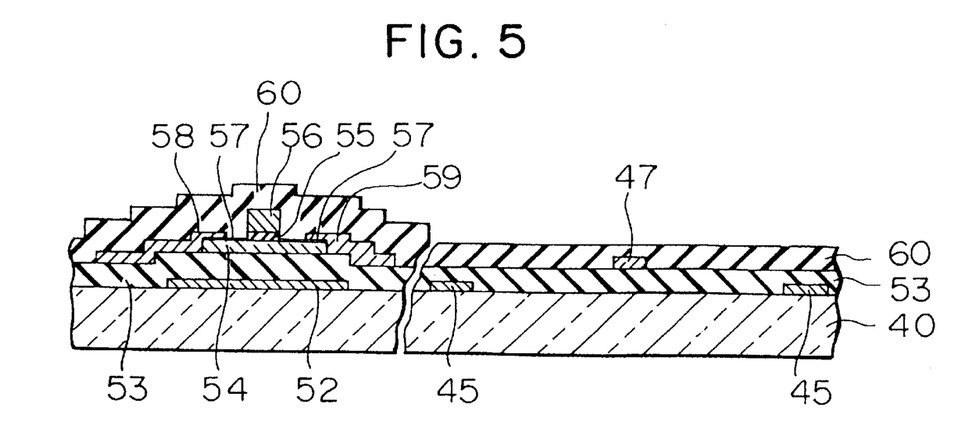
FIG. 5 is a sectional view in which the liquid crystal driving circuit pattern shown in FIG. 4 is provided on a substrate.

FIGS. 4 and 5 show the third embodiment of a driving circuit pattern applicable to a liquid crystal display element of the present invention. The driving circuit pattern of the third embodiment has a similar structure to that of the first embodiment, except that three linear electrodes 45 and two linear electrodes 47 are provided. In the figures, the same numerals as in the first embodiment indicate the same parts and explanations concerning these parts are omitted.

Almost the same effect as that obtained in the first embodiment can be obtained according to the structure shown in FIG. 4 and 5. In this embodiment, excellent display quality can be achieved with small dependency on angle of view because liquid crystal molecules 36 in a larger region can be forcibly oriented in parallel with the substrates by a larger number of linear electrodes 45 and 47.

As is mentioned in the above, according to the present invention, a liquid crystal display element is provided with a first substrate and a second substrate each having an orientation film with a top-gate structure having a gate electrode on a semiconductor film, a plurality of linear electrodes are formed on the first substrate so as to apply a voltage between these electrodes, and the orientation film of the first substrate is oriented in parallel with the longitudinal direction of the linear electrodes. Therefore, when no voltage is applied, liquid crystal molecules are oriented in the same direction as that of the orientation film of the first substrate; and when a voltage is applied, liquid crystal molecules near the first substrate are oriented in the direction perpendicular to the longitudinal direction of the linear electrodes of the first substrate, that is, perpendicular to the orientation direction of the orientation film on the first substrate. The liquid crystal molecules can be thereby converted between the non-twisted state and the 90° twisted state according to an "on state" and an "off state" of voltage while maintaining the liquid crystal molecules in parallel with both substrates. Therefore, a dark state and a bright state are switchable only by controlling the twisted degree of liquid crystal molecules in a top-gate structure in which a gate electrode is formed on a semiconductor film. As a result, a liquid crystal display element having a high switching speed and small dependency on angle of view can be provided. In addition, the overlapping area between the gate electrode, source electrode, and drain electrode decreases and the parasitic capacitance conventionally produced due to existence of insulating film between the overlapping portion is reduced.

Furthermore, the parasitic capacitance can be canceled by a capacitance produced by overlapping a portion of a linear electrode and a portion of another linear electrode opposed thereto with an insulating film therebetween. If the parasitic capacitance is reduced by employing the above top-gate structure, the capacitance produced by overlapping the linear electrodes can be lowered; and as a result, the linear electrodes can be narrowed and the aperture rate improved corresponding to the reduced width. Therefore, a liquid crystal display element capable of switching between a dark state and a bright state by only controlling the twisted degree of liquid crystal molecules can be provided, which liquid crystal display element has a high switching speed, small parasitic capacitance, and low dependency on angle of view.

What is claimed is:

1. A liquid crystal display element comprising:
   a first substrate provided with an orientation film;
   a second substrate which is arranged in an opposed position to said first substrate and which is provided with an orientation film on the first substrate side;
   a liquid crystal layer comprising nematic liquid crystal provided between said first substrate and said second substrate;

a plurality of linear electrodes arranged in parallel with each other at intervals on said first substrate and alternatively connected to opposing base wires to form comb-shaped electrodes, said opposing base wires disposed a predetermined distance from each other; and a switching element connected to a plurality of gate wires and signal wires formed in a matrix on said first substrate;

said orientation films of said first substrate and said second substrate being subjected to orientation treatment in parallel to the longitudinal direction of said linear electrodes;

wherein said switching element is composed of a shading film formed on said first substrate, an insulating film formed on said shading film, a semiconductor film formed on said insulating film on said shading film, a gate electrode formed above the center of said semiconductor film with an insulating portion therebetween, silicide layers formed at both sides of said semiconductor film, and a source electrode and a drain electrode both connecting to said semiconductor film via said silicide layers; and wherein the shading film and linear electrodes connected to one of said base wires are formed on the same plane on said first substrate and are covered with said insulating film, and linear electrodes connected to the other base wire are connected to said drain electrode and are disposed on said insulating film.

2. A liquid crystal display element as set forth in claim 1, wherein said gate electrodes are formed in the vicinity of the intersection of said gate wires and said signal wires, and said plurality of linear electrodes are arranged in regions surrounded by said gate wires and said signal wires.

3. A liquid crystal display element as set forth in claim 2, wherein either of a portion of said linear electrode formed on the same plane as said shading film on said first substrate or a portion of another linear electrode opposed to said linear electrode with said insulating film therebetween is extended and overlaps with the other electrode to produce capacitance.

* * * * *